United States Patent [19]
Manssen

[11] Patent Number: 5,878,209
[45] Date of Patent: Mar. 2, 1999

[54] APPARATUS AND METHOD FOR IDENTIFYING A FAILED SUBSCRIBER UNIT IN A WIRELESS COMMUNICATION SYSTEM

[75] Inventor: Keith R. Manssen, Long Grove, Ill.

[73] Assignee: Motorola, Inc., Schaumburg, Ill.

[21] Appl. No.: 984,657

[22] Filed: Dec. 2, 1992

[51] Int. Cl.⁶ .................................................. G06F 11/34
[52] U.S. Cl. ...................... 395/185.1; 379/57; 455/38.2; 455/67.1; 455/67.4; 455/67; 340/311.1; 371/20.1
[58] Field of Search ................................. 371/29.1, 21.6, 371/20.1, 16.5, 15.1; 379/53, 56, 2, 58, 1, 61, 26, 57, 40; 455/33.1, 54.1, 38.4, 67.1, 67.4, 38.2; 340/67.7, 311.1; 395/185.1

[56] References Cited

U.S. PATENT DOCUMENTS

| | | | |
|---|---|---|---|
| 3,805,038 | 4/1994 | Buedel et al. ..................... | 235/153 AK |
| 4,270,030 | 5/1981 | Brolin et al. .............................. | 370/13 |
| 4,654,867 | 3/1987 | Labedz et al. ............................. | 379/59 |
| 4,984,290 | 1/1991 | Levine et al. .............................. | 455/33 |
| 5,121,391 | 6/1992 | Paneth at al. ........................... | 370/95.1 |
| 5,128,979 | 7/1992 | Reich et al. ............................... | 379/40 |
| 5,280,486 | 1/1994 | Arkin et al. ............................. | 371/29.1 |

Primary Examiner—Robert W. Beausoliel, Jr.
Assistant Examiner—Phung M. Chung
Attorney, Agent, or Firm—Kevin D. Kaschke

[57] ABSTRACT

An apparatus and method provides identification of a failed subscriber unit (102) in a wireless communication system (100). In a first embodiment, the subscriber unit (102) performs a self test to detect a failure (302) of at least a portion of the subscriber unit (102). If a failure is detected, a message, stored (203) in the subscriber unit (102) is produced. In a second embodiment, the wireless communication system (100) includes a subscriber unit (102) including a receiver (102) communicating with a transmitter (101). The subscriber unit (102) has a unique code selectable by the transmitter (101). The subscriber unit (102) performs a self test to detect a failure (402) of at least a portion of the subscriber unit (102). If a failure is detected, a generic code is substituted (404) for the unique code. The transmitter (101) pages (406) the subscriber unit (102) with its generic code and transmits (407) an indication of the detected failure to the paged subscriber unit (102).

18 Claims, 3 Drawing Sheets

APPARATUS AND METHOD FOR IDENTIFYING A FAILED SUBSCRIBER UNIT IN A WIRELESS COMMUNICATION SYSTEM

FIELD OF THE INVENTION

The present invention relates generally to wireless communication systems and more particularly to an apparatus and method for identifying a failed subscriber unit in a wireless communication system.

BACKGROUND OF THE INVENTION

Wireless communication systems generally include subscriber units supported by an infrastructure. Subscriber units, such as selective call receivers (i.e. pagers) and radiotelephones, operating in the wireless communication systems are well known in the art and widely used. A person contacts a user of a subscriber unit by calling the subscriber unit's unique phone number. Of course, the user waiting to receive the call has no indication of when a call will be received by the subscriber unit.

Suppose now, for instance, that the subscriber unit has failed. The user waiting to receive a call doesn't know whether the subscriber unit is functioning properly and no calls were initiated or that the subscriber unit has indeed failed. Hours and even days may pass before the user discovers that the subscriber unit has failed. The user may periodically call their own subscriber unit to verify its functionality, but this procedure places the burden on the user to determine when a random failure would occur.

Therefore, there is a need to provide an automatic indication to the user that the subscriber unit has failed such that the user can take the necessary steps to have the subscriber unit repaired or replaced. Thus, the subscriber unit would incur less down time in the communication system and result in greater user satisfaction.

SUMMARY OF THE INVENTION

These needs and others are fulfilled by an apparatus and method producing an indication of a failed subscriber unit in the wireless communication system.

In a first embodiment of the present invention, the subscriber unit identifies a failure independent of the infrastructure. The subscriber unit performs a self test to detect a failure of the subscriber unit. If a failure is detected, an indication of a message stored in the subscriber unit is produced for the user using a procedure which is used for incoming messages from the communication system.

In a second embodiment of the present invention, the subscriber unit identifies a failure in cooperation with the infrastructure. The wireless communication system includes a subscriber unit including a receiver unit communicating with a transmitter. The subscriber unit has a unique code selectable by the transmitter in the wireless communication system. The subscriber unit performs a self test to detect a failure of the subscriber unit. If a failure is detected, a generic code is substituted for the unique code. The transmitter pages the subscriber unit with its generic code and transmits an indication of the detected failure to the paged subscriber unit.

DETAILED DESCRIPTION OF THE PREFERRED EMBODIMENTS

Figure 1:
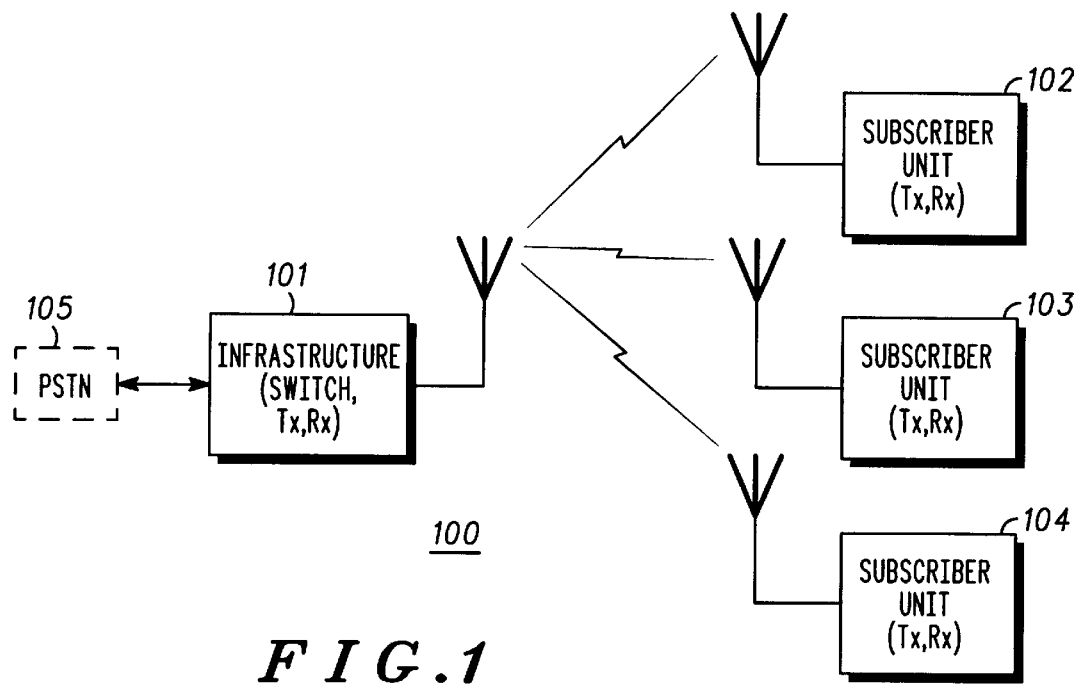
FIG. 1 is a block diagram of a wireless communication system including an infrastructure and subscriber units.

Referring to FIG. 1, there is shown a block diagram of a wireless communication system 100 including an infrastructure 101 and a plurality of subscriber units 102–104. The wireless communication system may optionally be coupled to a public switched telephone network 105 to provide communication between the network 105 and the subscriber units 102–104. The infrastructure 101 typically includes a switch and one or more base stations each having at least one of a transmitter and a receiver. The subscriber units 102–104 include at least one of a transmitter and a receiver. Each subscriber unit 102–104 has a unique code associated therewith selectable by the transmitter within the wireless communication system 100. The unique code typically corresponds to a unique phone number associated with each subscriber unit 102–104.

Examples of wireless communication systems depicted in FIG. 1 include paging systems and cellular and cordless radiotelephone systems. In a paging system 100, the infrastructure 101 includes a transmitter coupled to the network 105 and the subscriber units 102–104 each include a selective call receiver to provide one-way receive communication. In a cellular radiotelephone system 100, both the infrastructure 101 and the subscriber units 102–104 each include a transmitter and a receiver to provide two-way communication therebetween.

The details of blocks 101–105 and their functional relationship therebetween are well known in the art and will not be described further except to distinguish between what is well known and that described in the preferred embodiments of the present invention.

Figure 2:
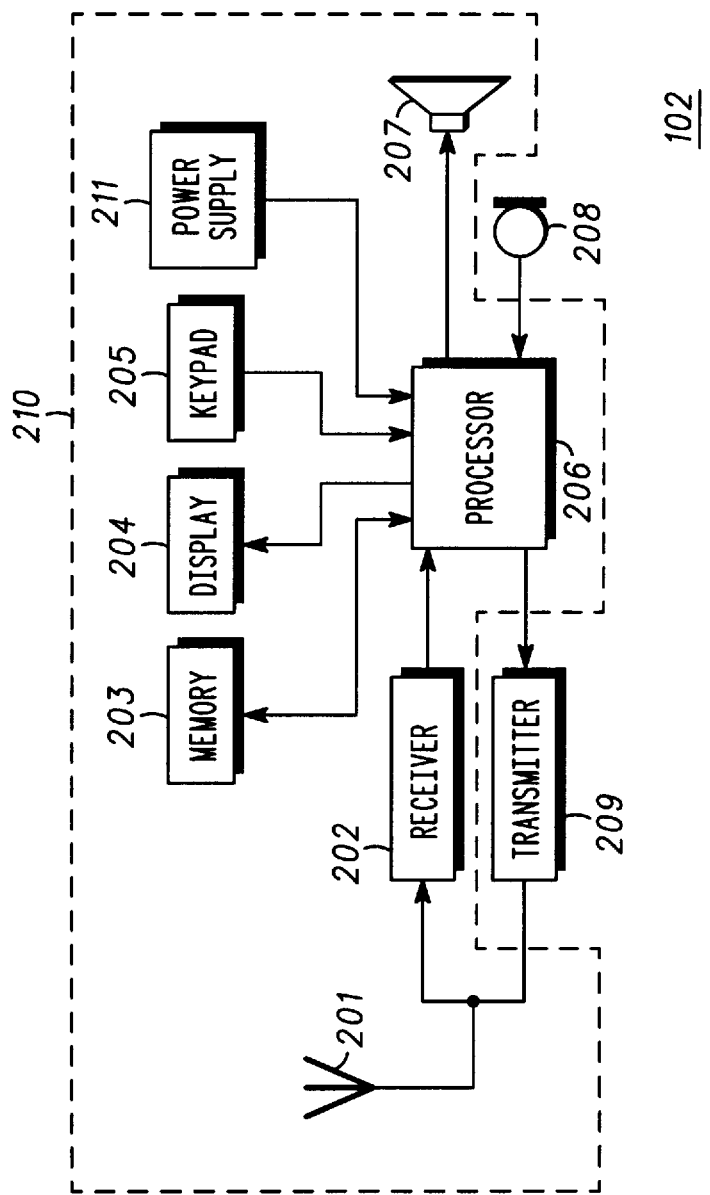
FIG. 2 is a block diagram of a subscriber unit of FIG. 1.

Referring now to FIG. 2, there is shown a block diagram of the subscriber unit 102 of FIG. 1. The subscriber unit 102 generally represents a radiotelephone. The subscriber unit 102 generally includes an antenna 201, a receiver 202, memory 203, a display 204, a keypad 205, a processor 206, a speaker 207, a microphone 208, a transmitter 209 and a power supply 211. The memory 203 includes conventional read only memory (ROM), random access memory (RAM) and electrically erasable programmable read only memory (EEPROM) and may be external or internal to the processor 206. The subscriber unit 102 is of a cellular portable type such as model number F09HYD8363BG, a cellular mobile type such as model number S2740A or a cordless type such as model number 34986. All models are manufactured and available from Motorola Inc. 600 North U.S. Highway 45, Libertyville, Ill. 60048.

Alternatively, the subscriber unit 102 represents a selective call receiver unit 210 depicted by a dashed line encompassing the antenna 201, the receiver 202, the memory 203, the display 204, the keypad 205, the processor 206 and the speaker 207. The selective call receiver is of the type such as model number A04JRC5661A, manufactured and available from Motorola Inc. 1500 N.W. 22nd Avenue, Boynton Beach, Fla. 33426-8292.

The details in FIG. 2 represented as a radiotelephone 102 in blocks 201–209 or as a selective call receiver unit 210 in blocks 201–207 and their functional relationship therebetween are well known in the art and will not be described further except to distinguish between what is well known and that described in the preferred embodiments of the present invention.

In present subscriber units 102 operating in communication systems 100, no mechanism or method is in place to notify the user of the subscriber unit 102 that the unit 102 has failed. Failures of the subscriber unit 102 may occur within any one of the elements shown in FIG. 2 as well as others not specifically shown.

Now focusing on the preferred embodiments of the present invention, an apparatus and method provides identification of a failure of at least one of the subscriber units 102–104 in the wireless communication system 100. In a first embodiment of the present invention, the subscriber unit 102 identifies a failure independent of the infrastructure 101. In a second embodiment of the present invention, the subscriber unit 102 identifies a failure in cooperation with the infrastructure 101.

Figure 3:
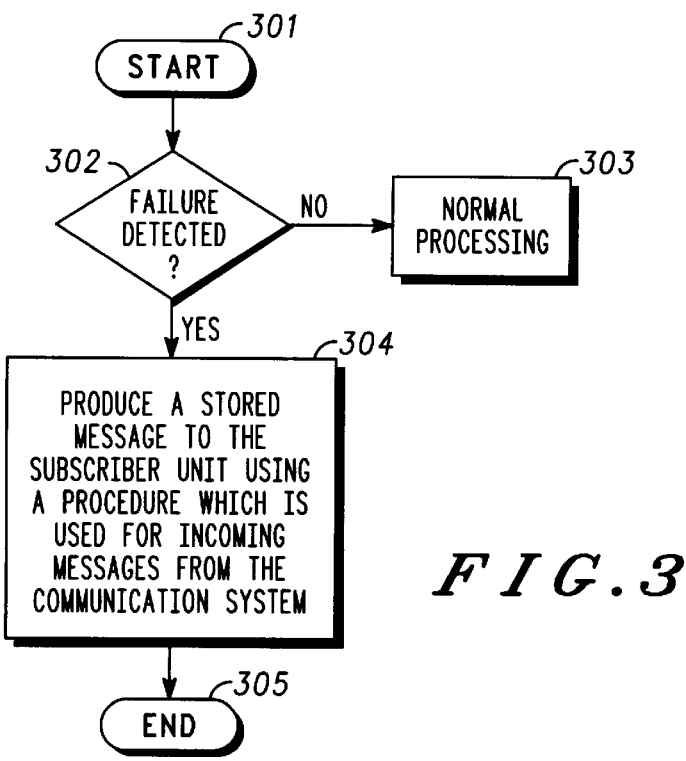
FIG. 3 is a process flow diagram of a first embodiment of the present invention performed by the subscriber unit of FIG. 2.

Referring now to FIG. 3, there is shown a process flow diagram for the first embodiment of the present invention performed by the subscriber unit of FIG. 2. The process is embodied in the processor 206 of FIG. 2 and performs its steps in cooperation with the other blocks represented. The failure indication process begins at step 301. At step 302, the subscriber unit 102 performs a self test to detect a failure of at least a portion of the unit 102. If no failure is detected, then the subscriber unit 102 continues with normal processing at step 303. However, if a failure is detected at step 302, a message, stored in memory 203 in the subscriber unit 102 produces an indication of the message for the user using a procedure which is used for incoming messages from the communication system.

The message is preferably a phone number programmed into the subscriber unit 102 by the service provider when the subscriber unit 102 is first given to the user. The user is provided with the phone number via the display 204. The phone number is a source from which the user contact to get additional help or information regarding the specific details of the failure or the procedure for getting the subscriber unit repaired. The phone number is stored in EEPROM in memory 203 such that it may be changed if needed or adapted for various locations of the subscriber units 102–104 within the communication system 100. Alternatively, other messages such as "SERVICE" or "FAIL" may be displayed by the display 204, or a simulated voice message or other audible alert may be produced by the speaker 207.

A clever aspect of the first embodiment of the present invention is that the subscriber unit 102 provides a failure indication to the user in a similar way normal messages are received by the subscriber unit 102. This is made possible by initiating the received message process responsive to the detected failure rather than responsive to control by the infrastructure 101 and by a predetermined message stored in the subscriber unit 102. Thus, the user is notified with no special training of the user, identification or hardware. The user simply responds to the message, as usual, and is thereby notified of the need for service. The subscriber unit provides a convenient indication of a failure of the subscriber unit 102 independent of the infrastructure 101 so that the down time of the communication system 100 is minimized.

For example, in the case of a pager 210, the phone number is provided to the user by the pager 210 itself in a similar manner as a typical infrastructure 101 would provide the phone number. Thus, the user perceives that the phone number displayed by the pager 210 is transmitted by the infrastructure 101 when in fact the phone number is produced by the pager 210 itself independent of the infrastructure 101. A pager 210, for example, receives a call by first alerting the user via a audible, vibratory or visual alert. Then the phone number is displayed by the pager 210 itself instead of being transmitted by the infrastructure 101.

Of course, special notification procedures may optionally be produced if so desired. A radiotelephone 102, for example, receives a call by first alerting the user via a audible, vibratory or visual alert. Then the phone number is displayed by the radiotelephone 102 itself rather than the normal process of requiring the user to answer the call. A special alert may be used to prompt the user that this is related to a failure and not a normal incoming call.

Examples of failures in portions of the subscriber unit 102 that the subscriber unit 102 tests, among other portions, include the antenna 201, the receiver 202, the memory 203, the display 204, the keypad 205, the processor 206, the speaker 207, the microphone 208 and the transmitter 209.

Receiver 202 failures in the subscriber unit 102 are advantageously detected, as well others, since the subscriber unit 102 performs the self test and provides the failure indication independent of the infrastructure 101. Additionally, the service provider of the infrastructure 101 only needs to be involved with the failure indication program when the subscriber unit 102 is initially programmed for the user. After the user is given the subscriber unit 102, the service provider is confident that the user will receive proper and prompt notification of a failure of the subscriber unit 102. The end result is that the user is happy to receive prompt notification and the service provider is happy to provide more continuous service.

The failure detection process at step 302 can be initiated by the subscriber unit 102 at a number of times. In the preferred embodiment of the present invention, the step of detecting 302 is activated each time after the subscriber unit 102 is powered on. Additionally, the step of detecting may be activated periodically in time after the subscriber unit is powered on to detect a failure during prolonged use. Alternatively, the step of detecting 302 can be activated responsive to the power supply means, rechargeable batteries for example, being recharged. In this alternative case, the failure detection process at step 302 would detect a failure between uses of the subscriber unit 102.

Thus, the first embodiment of the present invention provides an apparatus and method for identifying a failure of at least one of the subscriber units 102–104 in the wireless communication system 100 independent of the infrastructure 101. Next, in the second embodiment of the present invention, the subscriber unit 102 identifies a failure in cooperation with the infrastructure 101.

Figure 4:
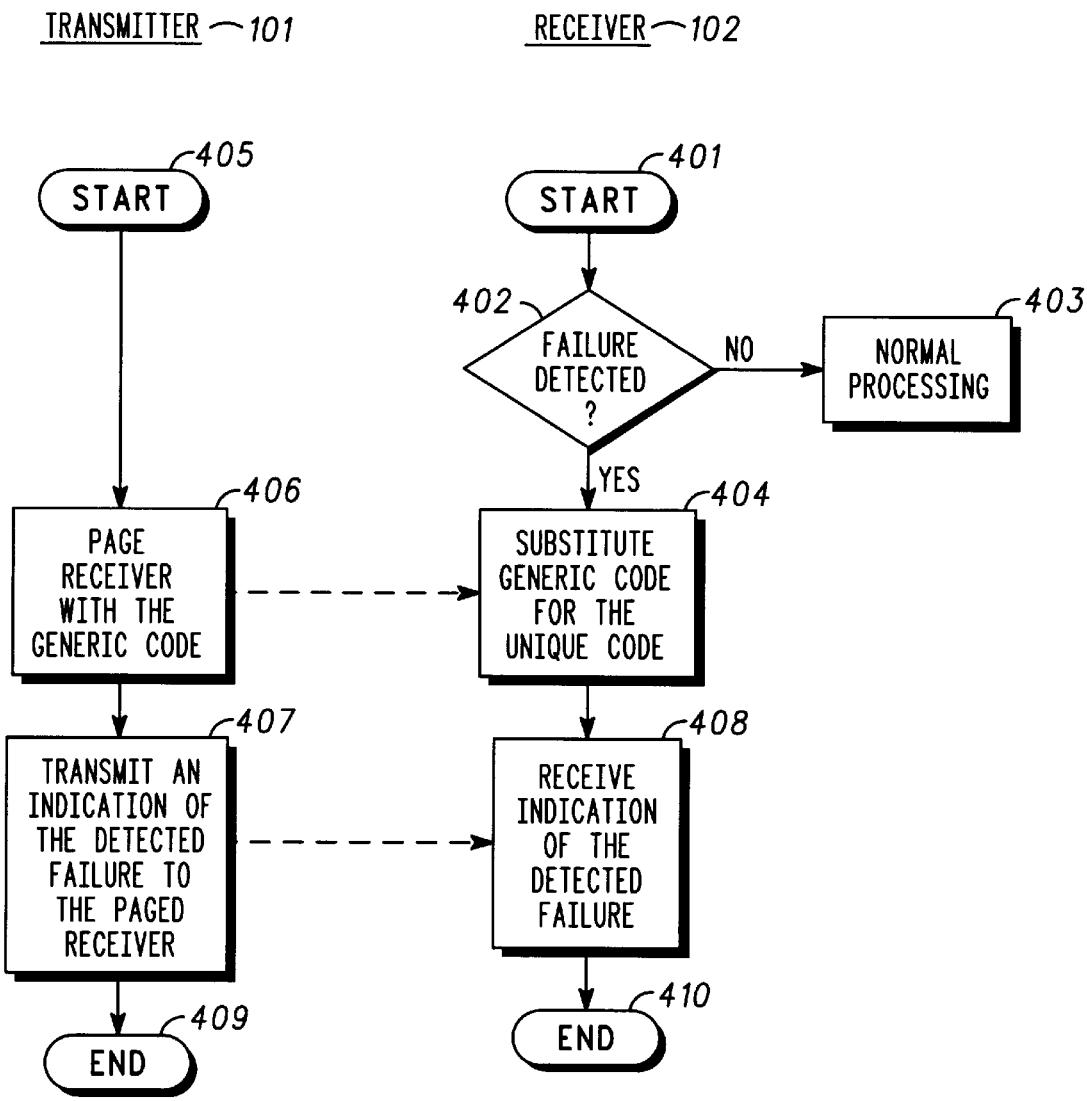
FIG. 4 is a process flow diagram a second embodiment of the present invention performed by the infrastructure and a subscriber unit of FIG. 1.

Referring now to FIG. 4, there is shown a process flow diagram for the second embodiment of the present invention performed by the infrastructure 101 and the subscriber unit 102 of FIG. 1. The wireless communication system 100 includes a subscriber unit 102 communicating with a transmitter 101. The receiver unit 210 of the subscriber unit 102 has a unique code stored in memory 203 for permitting selective indentification by the transmitter 101.

The failure indication process starts with the subscriber unit 102 performing step 401. At step 402, the subscriber unit 102 performs a self test to detect a failure of at least a portion of the receiver 210. If no failure is detected, then the subscriber unit 102 continues with normal processing at step 403. However, if a failure is detected at step 402, the subscriber unit 102 substitutes the unique code with a generic code in memory 203 at step 404. The unique code remains in tact and retrievable in the subscriber unit 102, but now the subscriber unit 102 can respond only to the generic code in the communication system 100. The transmitter 101 starts the failure indication process at step 405. The transmitter 101 identifies the subscriber unit 102 with its generic code at step 406 and transmits an indication of the detected failure to the identified subscriber unit 102 at step 407. The transmitter 101 and the subscriber unit 102 conclude the failure indication process at steps 409 and 410, respectively.

Examples of failures in portions of the subscriber unit 102 that the receiver unit 210 tests among other portions include the antenna 201, the receiver 202, the memory 203, the display 204, the keypad 205, the processor 206, the speaker 207, the microphone 208 and the transmitter 209.

The unique code is an electronic identification number typically stored in EEPROM 203 of the subscriber unit 102. In a pager, the unique code is commonly known as a cap-code; in a radiotelephone the unique code is commonly known as a electronic serial number (ESN). These numbers can be programmed into the pager at the manufacturing plant or in service facilities. Generally, the user does not have the capability to change or program the unique or generic code.

Since the subscriber unit 102 is notified of a failure by the infrastructure 101, it becomes the intrastructure's responsibility to determine and vary the periodicity of paging the subscriber unit 102 with the generic code. The provider of the infrastructure 101 may choose to page the generic code periodically to accommodate both the needs of the user and the provider, such as daily or hourly calls.

As in the first embodiment, a clever aspect of the first embodiment of the present invention is that the subscriber unit 102 provides a failure indication to the user in the same way normal messages are received by the subscriber unit 102 from the infrastructure 101. This is made possible by the infrastructure 101 periodically paging the receiver units having the generic code and providing a message from the infrastructure to subscriber unit 102. Thus, the user is notified using normal procedures and no special training of the user or identification or hardware is needed. The user simply responds to the message, as usual, and is thereby notified of the need for service. The subscriber unit 102 in cooperation with the infrastructure 101 feature provides a convenient indication of a failure of the receiver unit 210 so that the down time of the communication system 100 is minimized. Upon receiving service, the unique code is substituted, or reprogrammed, for the generic code and the subscriber unit 102 is again operational to receive calls directed to its unique identification number.

In the case of a pager 210 or radiotelephone 102, the indication of a detected failure is transmitted to the user by the transmitter 101 in a similar manner as a typical transmitter 101 would call the pager 210 or radiotelephone 102. A pager 210, for example, receives a call by first alerting the user via a audible, vibratory or visual alert. Then the message such as a phone number is transmitted to the pager 210 by the transmitter 101 to notify the user of the failure. A radiotelephone 102, for example, receives a call by first alerting the user via a audible, vibratory or visual alert. Then a live or prerecorded voice message is provided by the transmitter 101 to notify the user of the failure when the call is answered. These information can include warranty information, repair facility locations, or repair price rates and turn-around times. Therefore, the user needs no special training to be notified of a failure. Of course, special notification procedures may optionally be produced if so desired.

In the second embodiment of the present invention, receiver 202 failures cannot be detected, as described in the first embodiment, since the receiver is needed to receive the call from the infrastructure 101. However, additional benefits are gained by having the infrastructure 101 participate in the failure detection procedure. One such benefit enables the service provider to change the message produced for the subscriber unit 102 responsive to the location of the subscriber unit 102. In the case of wide area coverage communication systems 100, such as a nationwide paging or cellular system, the user would be transmitted a message to contact the service center nearest the subscriber unit 102.

As in the first embodiment of the present invention, the failure detection process at step 402 can be initiated by the subscriber unit 102 at a number of times including each time after the subscriber unit 102 is powered on and responsive to recharging the power supply means.

The indication of the detected failure at step 407 provided by the transmitter is preferably visual by displaying at least one of a message, a phone number and illuminated indicating means. By addition or by substitution, audible and vibratory notification may also be activated by the transmitter 101.

Therefore, an apparatus and method provides identification of a failure of at least one of the subscriber units 102–104 in the wireless communication system 100. In the first embodiment of the present invention, the subscriber unit 102 identifies a failure independent of the infrastructure 101. In a second embodiment of the present invention, the subscriber unit 102 identifies a failure in cooperation with the infrastructure 101. In both embodiments, the subscriber unit 102 is notified of a failure promptly to reduce down time in the communication system 100.

What is claimed is:

1. A wireless communication system comprising:
   a subscriber unit including:
      a memory unit having a unique paging code and a generic paging code stored therein, wherein only one of the unique paging code and the generic paging code is active in the subscriber unit at one time, wherein the subscriber unit is permitted to receive a unique paging message which is intended only for the subscriber unit when the unique paging code is active, and wherein the subscriber unit is permitted to receive a generic paging message which is intended for more than one subscriber unit when the generic paging code is active; and
      a processor, coupled to the memory unit and circuitry in the subscriber unit, for performing a self test on the circuitry in the subscriber unit to detect a failure of the circuitry in the subscriber unit, wherein the processor deactivates the unique paging code and activates the generic paging code responsive to detecting the failure; and
   a base station transmitter, coupled to the subscriber unit over a wireless communication channel, for paging the subscriber unit using the generic paging code by transmitting a page signal and transmitting a failure message to the paged subscriber unit,
   wherein the subscriber unit further includes:
      a receiver, coupled to the processor, for receiving the page signal and the failure message from the base station transmitter and for sending the page signal and the failure message to the processor; and an alert device, coupled to the receiver, for alerting a user of the subscriber unit that the page signal has been received and that the failure message has been received.

2. A wireless communication system according to claim 1 wherein the processor performs the self test within a predetermined time period after the subscriber unit is powered on.

3. A wireless communication system according to claim 2 wherein the processor performs the self test periodically after expiration of the predetermined time period.

4. A wireless communication system according to claim 1 wherein the subscriber unit further includes:

rechargeable power supply for supplying power to the subscriber unit, wherein the processor performs the self test within a predetermined time period after the subscriber unit is coupled to the rechargeable power supply.

5. A wireless communication system according to claim 1 wherein the alert device further comprises:

a display, coupled to the processor, for displaying at least one of the failure message and a phone number which the user can call to request that the circuitry in the subscriber unit be repaired.

6. A wireless communication system according to claim 1 wherein the wireless communication system is a paging system and wherein the subscriber unit is a paging receiver subscriber unit.

7. A wireless communication system according to claim 1 wherein the wireless communication system is a radiotelephone system and wherein the subscriber unit is a radiotelephone subscriber unit.

8. A method for operating a wireless communication system including a subscriber unit and a base station transmitter, wherein the subscriber unit has a unique paging code stored therein, and wherein the base station transmitter pages a subscriber unit using the unique paging code when the unique paging code is active in the subscriber unit and transmits a unique paging message only to the subscriber unit having the unique paging code, the method comprising the steps of:

performing, by the subscriber unit, a self test on the circuitry in the subscriber unit to detect a failure of the circuitry in the subscriber unit;

detecting, by the subscriber unit, a failure of the circuitry in the subscriber unit responsive to the step of performing the self test;

deactivating, by the subscriber unit, the unique paging code in the subscriber unit responsive to the step of detecting the failure;

activating, by the subscriber unit, a generic paging code in the subscriber unit responsive to the step of deactivating, wherein the subscriber unit is permitted to receive a generic paging message from the base station transmitter which is intended for more than one subscriber unit when the generic paging code is active;

paging, by the base station transmitter, the subscriber unit using the generic paging code with a page signal over a wireless communication channel;

transmitting, by the base station transmitter, a failure message to the paged subscriber unit over the wireless communication channel;

receiving, by the subscriber unit, the page signal and the failure message from the base station transmitter; and alerting, by the subscriber unit, a user of the subscriber unit that the page signal has been received and that the failure message has been received.

9. A subscriber unit comprising:

a memory unit having a unique paging code and a generic paging code stored therein, wherein only one of the unique paging code and the generic paging code is active in the subscriber unit at one time, wherein the subscriber unit is permitted to receive a unique paging message from a base station transmitter which is intended only for the subscriber unit when the unique paging code is active, and wherein the subscriber unit is permitted to receive a generic paging message from the base station transmitter which is intended for more than one subscriber unit when the generic paging code is active;

a processor, coupled to the memory unit and circuitry in the subscriber unit, for performing a self test on the circuitry in the subscriber unit to detect a failure of the circuitry in the subscriber unit, wherein the processor deactivates the unique paging code and activates the generic paging code responsive to detecting the failure;

a receiver, coupled to the processor, for receiving a page signal transmitted from the base station transmitter over a wireless communication channel and the failure message from the base station transmitter over the wireless communication channel, and for sending the page signal and the failure message to the processor; and an alert device, coupled to the receiver, for alerting a user of the subscriber unit that the page signal has been received by the receiver from by the base station transmitter and that a failure message has been received by the receiver from the base station transmitter.

10. A subscriber unit according to claim 9 wherein the processor performs the self test within a predetermined time period after the subscriber unit is powered on.

11. A subscriber unit according to claim 10 wherein the processor performs the self test periodically after expiration of the predetermined time period.

12. A subscriber unit according to claim 9 wherein the subscriber unit further includes:

rechargeable power supply for supplying power to the subscriber unit, wherein the processor performs the self test within a predetermined time period after the subscriber unit is coupled to the rechargeable power supply.

13. A subscriber unit according to claim 9 wherein the alert device further comprises:

a display, coupled to the processor, for displaying at least one of the failure message and a phone number which the user can call to request that the circuitry in the subscriber unit be repaired.

14. A subscriber unit according to claim 9 wherein the subscriber unit is a paging receiver subscriber unit.

15. A subscriber unit according to claim 9 wherein the subscriber unit is a radiotelephone subscriber unit.

16. A base station transmitter for paging a subscriber unit using a unique paging code when the unique paging code is active in the subscriber unit and to transmit a unique paging message only to the subscriber unit having the unique paging code stored therein, the base station transmitter comprising:

a paging system for paging a plurality of subscriber units using a generic paging code over a wireless communication channel, wherein paging system pages each of the plurality of subscriber units using the generic paging code when the generic paging code is active in each of the subscriber units, wherein only one of the unique paging code and the generic paging code is active in a subscriber unit at one time, and wherein the generic paging code is active in the subscriber unit responsive to detecting a failure during a self test on circuitry in the subscriber unit; and a transmitter, coupled to the paging system, for transmitting a failure message to the paged subscriber unit over the wireless communication channel, wherein the subscriber unit alerts a user of the subscriber unit that the subscriber unit has been paged and that the failure message has been received from the transmitter.

17. A base station transmitter according to claim 16 wherein the base station transmitter is a paging base station transmitter for paging a paging receiver subscriber unit.

18. A base station transmitter according to claim 16 wherein the base station transmitter is a radiotelephone base station transmitter for paging a radiotelephone subscriber unit.

* * * * *